United States Patent [19]

Steffel

[11] Patent Number: 4,838,155
[45] Date of Patent: Jun. 13, 1989

[54] NUTCRACKER APPARATUS

[76] Inventor: Vern G. Steffel, 3380 Texas Ave. South, St. Louis Park, Minn. 55426

[21] Appl. No.: 125,347

[22] Filed: Nov. 25, 1987

[51] Int. Cl.$^4$ .............................................. A23N 5/00
[52] U.S. Cl. ...................................... 99/572; 99/577; 99/579; 99/582
[58] Field of Search ......................... 99/568, 571–573, 99/577, 578, 581, 582, 579; 30/120.2, 120.5

[56] References Cited

U.S. PATENT DOCUMENTS

| 842,398 | 1/1907 | Gebhardt | 99/572 |
| 1,273,974 | 7/1918 | Woodson | 99/572 |
| 1,482,018 | 1/1924 | Leonard | 99/578 X |
| 3,159,194 | 12/1964 | Anderson | 99/573 |

Primary Examiner—Timothy F. Simone
Attorney, Agent, or Firm—Clayton R. Johnson

[57] ABSTRACT

The nutcracker apparatus includes a frame on which there is provided a front and a rear head assembly that each has a head which is resiliently urged toward the other but is limited in such movement by a knife at least in part located in a slot in the head. Each knife is mounted on a rod, the rear rod being movable toward the front rod to initially clamp the nut and as the movement of one head toward the other is limited by the uncracked nut, the rear knife continues to move toward the front knife to crack and/or split the nut. In one embodiment the rear knife is mounted by the rear rod which is moved forwardly by a pivotal handle moving binder members into binding engagement against the rear rod. In the second embodiment the rear rod is a piston rod of a piston cylinder combination that is operated automatically to crack a nut as the nut is dropped between the heads.

21 Claims, 2 Drawing Sheets

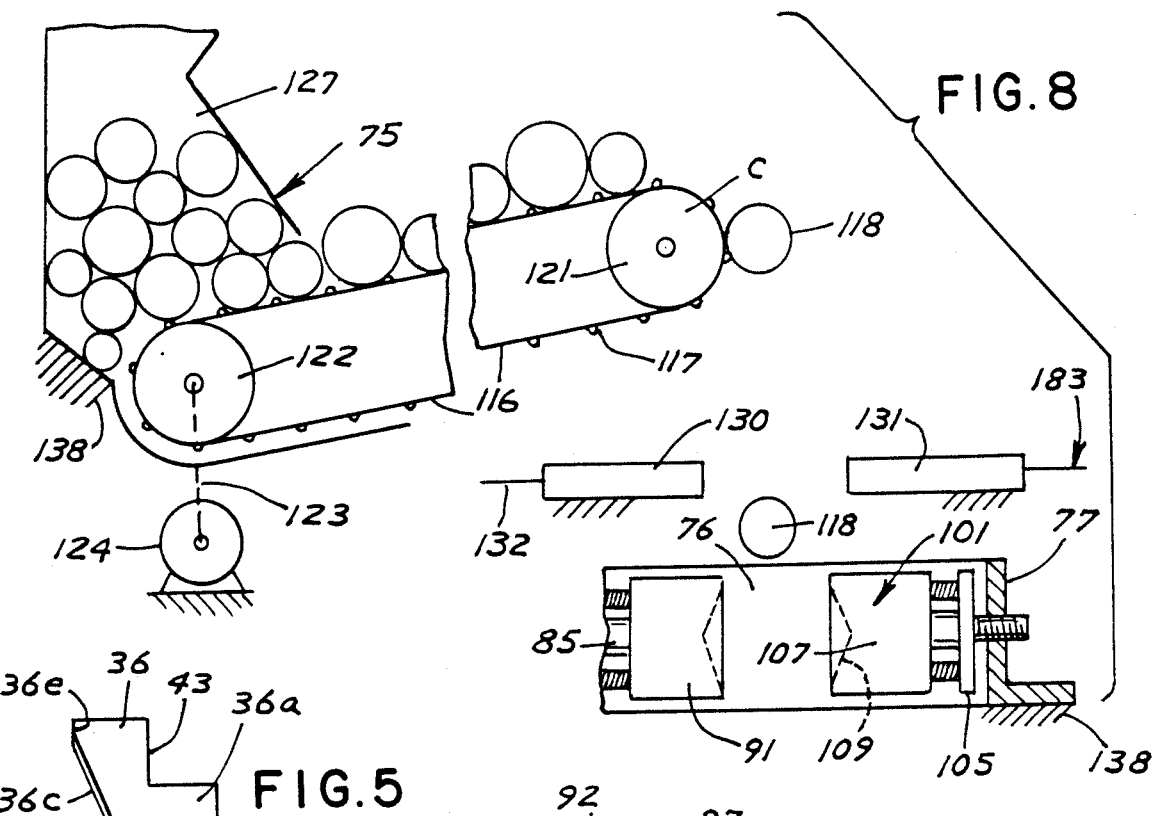
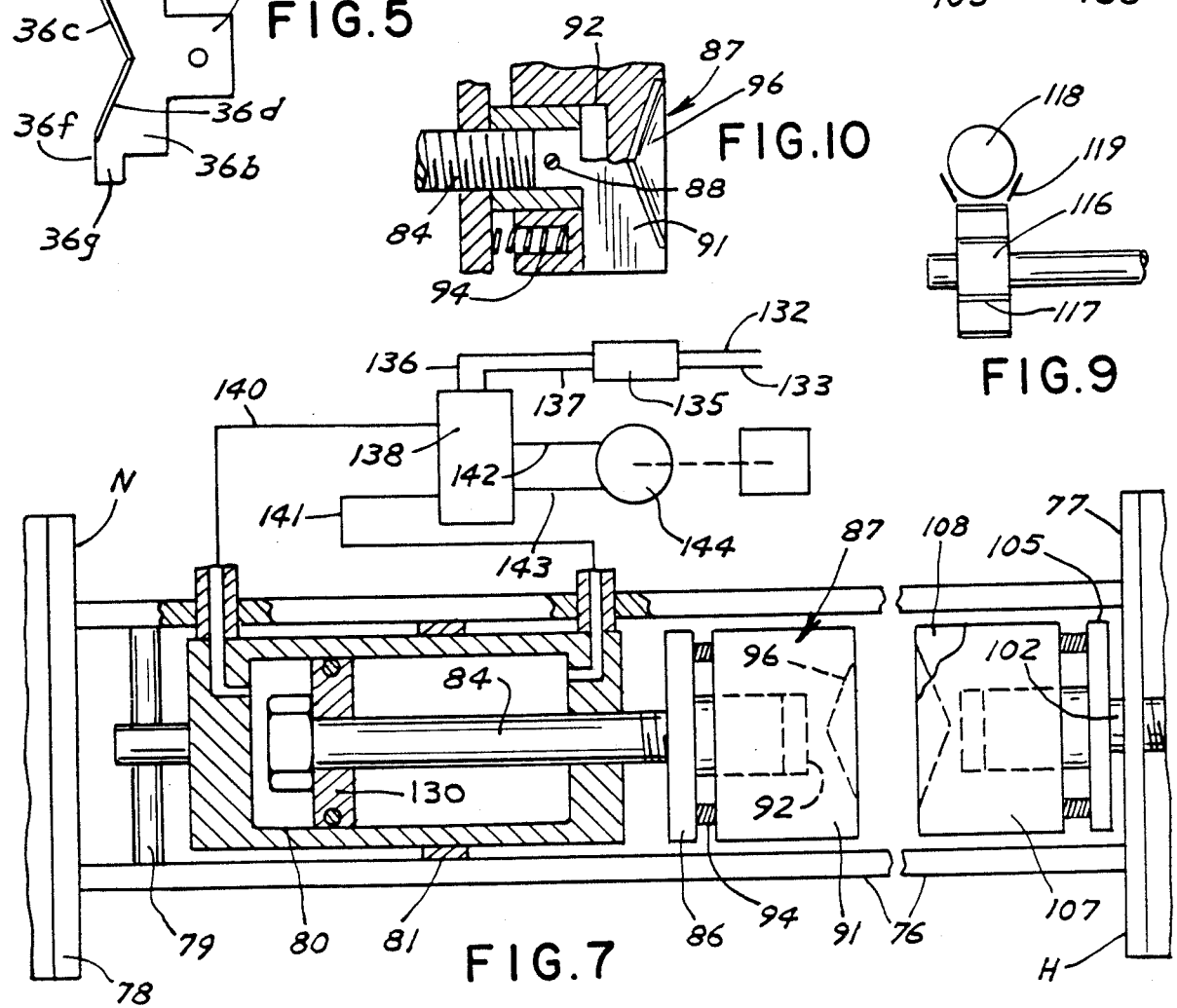

NUTCRACKER APPARATUS

BACKGROUND OF THE INVENTION

Apparatus for cracking and/or splitting nuts having edible nut meats, for example macadamia and Brazil nuts, walnuts, chestnuts and etc.

U.S. Pat. No. 4,255,855 to Brazil discloses a nutcracker having a wedged shaped portion extending rearwardly of the anvil, a rear head mounted by a plunger that is longitudinally movable in a frame hole, and a lever pivotally attached to the frame and pivotally connected to a link that in turn is pivotally connected to the plunger. U.S. Pat. No. 3,713,468 discloses a nutcracker having a first jaw threadedly mounted by a frame front end portion and a second jaw longitudinally movable by a lever with a link pivotally connected to the second jaw and lever, each jaw having a recess opening toward the other.

U.S. Pat. No. 3,223,133 to Broakey discloses a frame having a handle integrally joined thereto, a recessed front jaw mounted by the front end portion of the frame, a plunger longitudinally movably mounted by the frame that mounts a recessed jaw for movement therewith and having a plurality of ratchet teeth, a lever pivotally mounted by the handle, a ratchet pivotally mounted by the lever and having a cam face, a spring for constantly urging the ratchet into engagement with the plunger ratchet teeth, and a stop member on the frame for swinging the ratchet out of engagement with the ratchet teeth when the hand grip part of the lever is pivoted away from the handle. The plunger mounts friction material resiliently transversely urged into engagement with the frame to tend to hold the plunger in a longitudinally adjusted position, the rear jaw being manually graspable to move the plunger to a position the rear jaw abuts against the nut.

In order to provide improved apparatus to crack nuts, especially hard nuts such as macadamia nuts, this invention has been made.

SUMMARY OF THE INVENTION

Nutcracker apparatus that includes a frame, a first and a second head assembly on the frame that are oppositely faced, each head assembly including a head having a recess facing the other and a knife slot opening to the recess, a knife at least in part located in the slot and a longitudinally elongated rod that mounts the knife in fixed longitudinal relationship thereto, the head being movably mounted on the rod and resiliently retained so that the knife does not extend longitudinally outwardly of the head recessed surface and being movable relative to the rod to a position that the knife does extend a significant longitudinal distance outwardly of the head recessed surface as a nut is being cracked, and mechanism for moving the rod, head and knife of one of the assemblies toward the other to crack and/or split the nut.

One of the objects of this invention is to provide in a nutcracker, new and novel head assembly means for cracking and/or splitting a nut having an edible nut meat. In furtherance of the above object, it is another object of this invention to provide first and second head assemblies and new and novel means for moving one head assembly relative to the other to crack a nut. Also in furtherance of the last mentioned object, it is another object of this invention to provide new and novel manually operated leverage means for moving the second head assembly toward the first. Additionally in furtherance of the next to the last mentioned object, it is a still further object of this invention to provide new and novel means for dropping one nut at a time and automatically operating the second head assembly to move toward the first head assembly to crack a nut.

DESCRIPTION OF THE DRAWINGS

FIG. 5 is a side view of the front knife of the first embodiment to the invention;

FIG. 7 is a plan view of the second embodiment of the nut cracker unit of this invention with the piston and cylinder being shown in cross section and longitudinal intermediate frame portions broken away, and some of the controls being diagramatically shown;

FIG. 8 is a fragmentary diagramatic showing of the second embodiment of this invention with various parts being broken away;

FIG. 9 is a fragmentary diagrammatic showing of the conveyer that is at generally right angles to the showing in FIG. 8; and FIG. 10 is a fragmentary, vertical cross sectional view of the rear head assembly of the second embodiment with part of the knife broken away.

Referring to FIGS. 1-6, the first embodiment of the nutcracker of this invention, generally designated 10, includes a longitudinally elongated frame F having a generally horizontal base 11, vertical transverse, longitudinally spaced, front, intermediate and rear frame portions 12, 13, 14 respectively that are integrally joined to the base to extend thereabove and a pair of vertical, transversely spaced ears 15 integrally joined to the rear frame portion to extend rearwardly thereof and to the base to extend thereabove. Lugs 16 are joined to the base for being mounted to a table (not shown) or other suitable structure.

Figure 1:
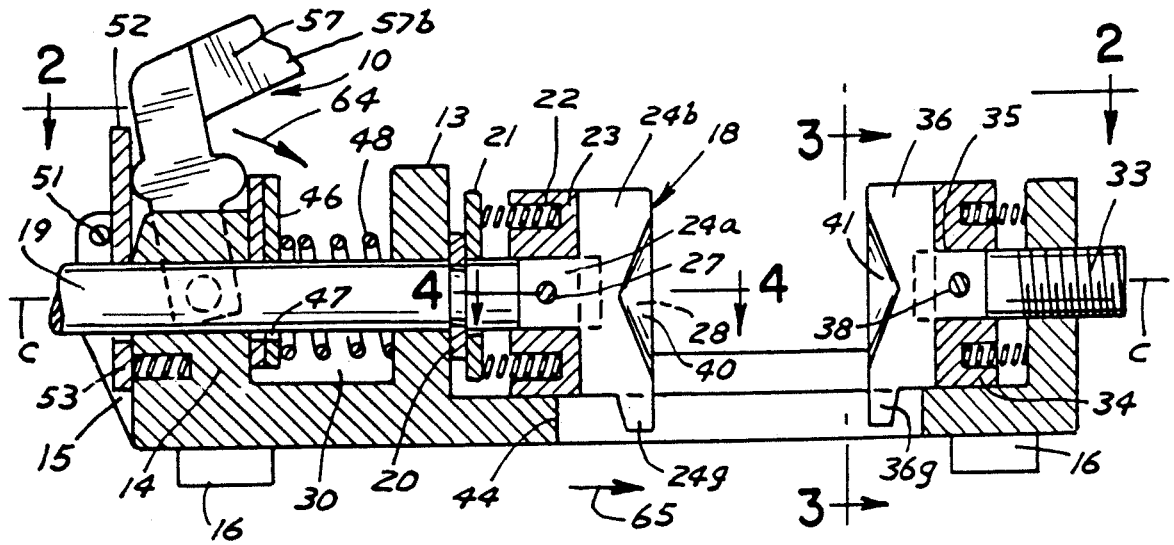
FIG. 1 is a vertical, longitudnal cross sectional view through the first embodiment of the invention with the rear head assembly in its fully retracted position and the handle in its datum position.

A rear cylindrical head assembly, generally designated 18, includes a longitudinal rear rod 19 slidably extended through a horizontal apertures in the frame intermediate and rear portions. A stop (retainer) 20 extends into a groove in the rod 19 to block longitudinal movement of the stop relative to the rod and, when abutting against the front surface of the frame intermediate portion, prevent further rearward movement of the rear rod 19 relative to the frame. An annular retainer member 21 is provided on the rear rod to abut against the retainer 20, springs 22 having rear ends abutting against the retainer member and extended into apertures in the rear head 23 for constantly resiliently urging the head in a forward direction. The rear head has a vertical, diametric, forwardly opening slot 25 that opens to the head rear bore 28, a rear knife 24 being located in the slot and having a tab 24a extended into said bore and the clevised front end portion of the rod. A pin 27 is extended throught apertures in the clevised portion and tab 24a for mounting the knife to the rod and retain the knife in a given longitudinal position relative to the rod. The vertical rear edge portions of the rear knife main body 24b in abutting against the rear head wall portions that in part defines head slot 25 limits the forward movement of the head relative to the rod and retainer member 21 (rear head datum position).

A front head assembly, generally designated 32, includes a front rod 33 threaded into the frame front portion 12, a front cylindrical head 34 that is resiliently urged rearwardly by springs 22 abutting against the rear surface of the front frame portion and extended into apertures in the front head, a front knife 36 in part located in the vertical, diametric, rearwardly opening head knife slot 37 and having a tab portion 36a extended into the head bore 35 and a a pin 38 extending through apertures in the rear clevised end part of the front rod and the front knife tab portion. The forward movement of the head 34 relative to the rod 33 is limited by the head abutting against the rear surface of the frame front portion and/or the rear end of the front rod while the rearward movement is limited by the front knife abutting against the head walls that extend radially of the head bore and define the front edges of the slot 37. The forward movement of the rear head is correspondingly limited by the rear knife radial edges extending radially outwardly of the tab portion 24a abutting against the rear of the rear head knife slot.

The rear and front heads have facing conical recesses 40, 41 respectively to facilitate holding and cracking a nut. As seen in FIG. 1, the apexes of surfaces 40, 41 are axially more remotely spaced than the radial outer peripheral edges of the heads defining surfaces 40, 41. Further to facilitate cracking a nut the heads are movable relative to the knifes. That is when the heads are in their datum positions relative to the rods 19, 33 such as shown in FIG. 1, the adjacent ends of the head bores are more closely adjacent to one another than when with the rods remaining stationary the heads are moved to abut against the respective rod adjacent end portion and/or the rear retainer member 21 and frame front frame portion respectively. Thus in the head datum positions, the adjacent rod end portions are at their maximum spacing from the closed ends of the head bores. The maximum rearward movement of the rear head on the rear rod is limited by the rear head abutting against one or both of the retainer member 21 and the front end of the rear rod while the forward movement of the front head is likewise limited by the front head abutting against the frame portion 12 and/or rear end of the front rod 33.

Figures 3, 4, 6:
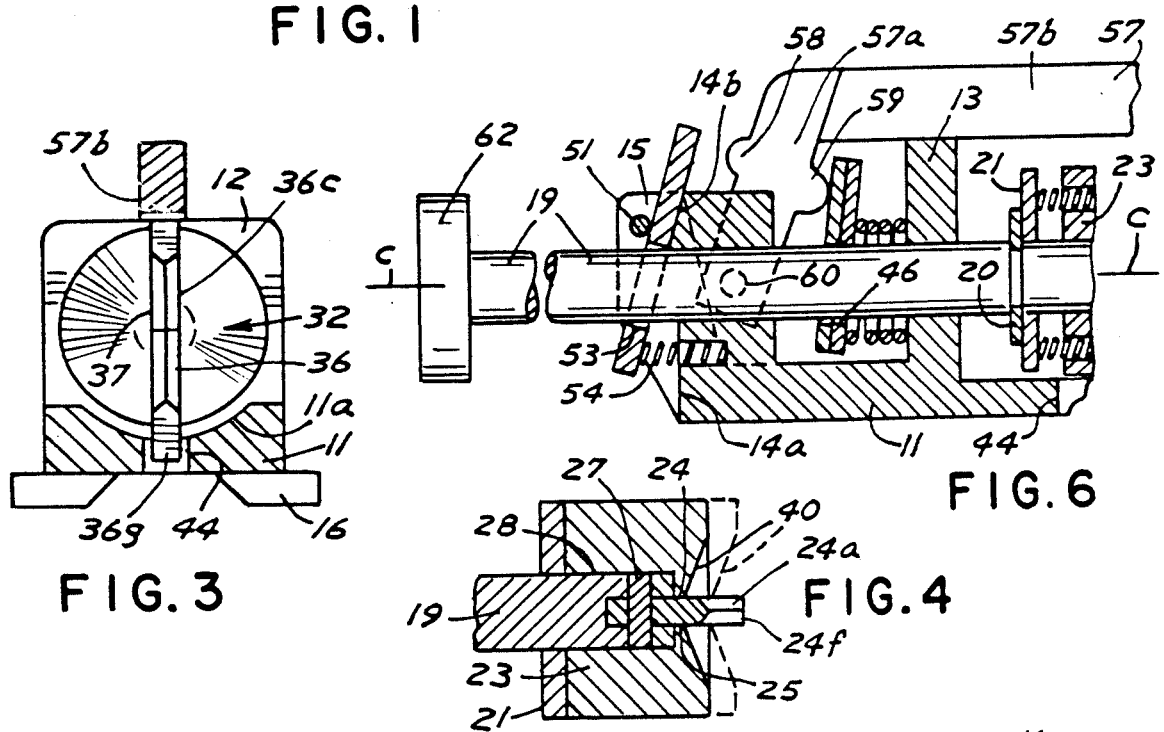
FIG. 3 is a transverse cross sectional view of the first embodiment that taken in the direction of the arrows 3—3 of FIG. 1 except the handle is in its lowered position.
FIG. 4 is a fragmentary horizontal cross sectional view of the rear head assembly that is generally taken along the line and in the direction of the arrows 4—4 of FIG. 1, the head being shown in its datum position in dotted lines and in its nut cracked position in solid lines prior to the head returning to its datum position.
FIG. 6 is a vertical longitudinal cross sectional view of the rear portion of the first embodiment with the handle in its lowered position.
Figure 2:
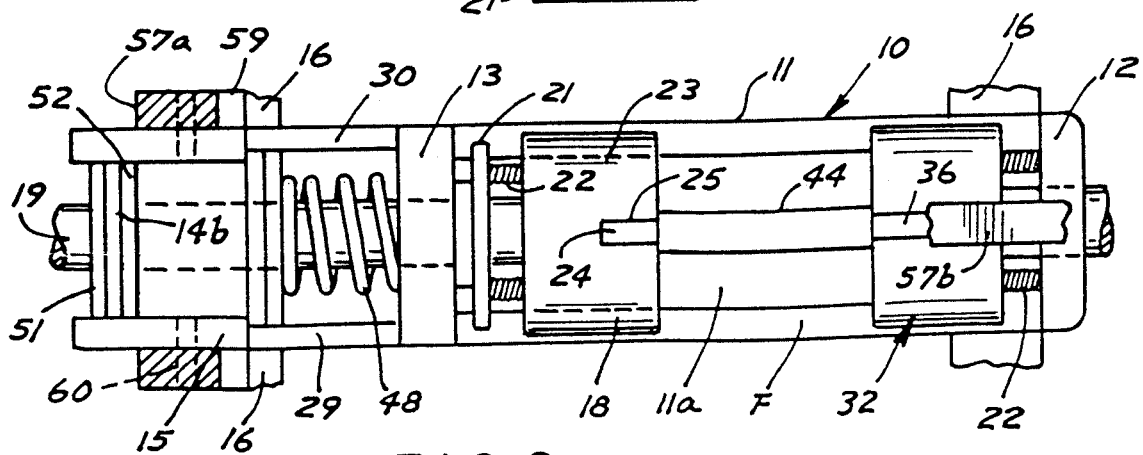
FIG. 2 is a plan view generally taken along the line and in direction of the arrows 2—2 of FIG. 1 other than a fragmentary portion of the forward end portion of the handle is also shown.

Since both of the knives are of the same construction, primarily only knife 36 will be described. The knife 36 has inclined sharpened edges 36c, 36d respectively that converge in a direction toward tab portion 36a, the angle of inclination being substantially the same as the angle of inclination of the head recess 41. Thus the sharpened edges of a knife diverge in a direction away one another (away from the rod central axis). The knife 36 also includes a top radial, non-sharper edge 36e and a diametric opposite radial, non-sharpened lower edge 36f. Rear knife edges 24d, 24f correspond to edges 36d, 36f and are shown in FIG. 4. Further the knives respectively have ear portions 24g, 36g extended into a longitudinal slot 44 formed in the frame base longitudinally between frame portions 12, 13 to maintain the heads in substantially fixed angular relationship relative to one another and to the frame as the heads are moved longitudinally relative to the frame. Additionally the knife 36 has radial flat edges 43 on diametric opposite sides of the tab 36a that are abuttable against head wall portions defining the front end of slot 37 (knife 24 having corresponding edges abuttable against the head wall portions defining the rear edges of the slot of head 23) that serve to limit the movement relative to the rods as previously set forth.

Mounted on the shaft 19 axially between the frame rear and intermediate portions are a pair of front binder members 46 with one being abuttable against the vertical front surface of the rear frame frame member 14. The other binder member 46 is resiliently retained in abutting relationship to the one binder member by a coil spring 48 on the rod 19 and having a front end abutting against the rear surface of the intermediate frame portion 13. Each of the binder members has an inner cylindrial peripheral edge defining an aperture 47 that is of a slightly larger diameter than rod 19 (for example, by about 0.002") in order to permit the binder members moving from a vertical position such as shown in FIG. 1 to tilt to a binding position such as shown in FIG. 6 (for example, about 78°–85° relative to the horizontal). In the inclined upwardly and forwardly binding position and a sufficiently great forward force is applied to the upper binder portion of the rear binder member 46 vertically above the rod 19, such a force causes the rod to move forwardly (provided the forward movement of the head 23 is not blocked).

To preclude the binder members 46 from rotating any substantial amount on the rod, the binder members may be generally rectangular and there may be provided longitudinal frame portions 29, 30 joined to the base to extend thereabove to a higher elevation than the lower edges of the binder members, even in their binding position; but below the central axis C—C of rod 19, and to extend longitudinally between frame portions 13, 14. Thus even though the binder members extend to a higher elevation than the rear frame portion and further upwardly above the central axis than below, the binder members will not rotate on the rod a substantial amount and will be operable as set forth herein.

Mounted on rod 19 to be abuttable against one of the vertical lower rear surface portion 14a of the rear frame portion 14 and the upper rear surface portion 14b that is inclined upwardly in a forward direction and located between ears 15 to prevent rotation is a a rear, generally rectangular binder member 53. A transverse pin 51 is mounted by the ears 15 to be just above the rod 19 to limit the rearward movement of the upper portion of the rear binder member to a substantially vertical condition while the lower part of the binder member is moved into abutting relationship with the surface 14a which extends below the central axis of the rod 19. The rear binder member has an inner peripheral wall portion defining an aperture 53 of a sufficiently greater diameter than that of the rod to permit the binder member to move between its vertical rod release position and to the inclined binding position of FIG. 6 to block rearward movement of the rear rod. The binder member prevents rearward movement of rod 19 prior to the binder member being in flat abutting relationship to surface 14b. Coil springs 54 have one end portions seated in bores in the frame portion 14 back part and opposite ends abutting against member 52 below the rod to constantly resiliently the rear retainer member to pivotally swing about the pin 51 toward its rod binding porsition. The angle of inclination of the surface of the binder member 52 may be, for example 78°–85°.

For coacting with the binder member 46 for forwardly moving the rod 19 is a handle 57 having a bifurcated handle portion 57a that has terminal end portions pivotally connected to the rear frame portion by transverse pivots 60 adjacent to or above the elevation of the rod 19. The bifurcated portion 57a of the handle (lever) 57 in each of the handle positions extends predominently upwardly from the pivots 60 and an elongated manually grasped portion 57b that in each of its positions extends predominently horizontally forwardly of portion 57b. Further portion 57b is of a longitudinal length and protrusions 59 on portion 57a are located relative to the pivots such that substantial leverage is obtained during the nut cracking procedure.

Each of the bifurcated portions of portion 57a has one of the front protrusions with a curved front surface abuttable against the upper portion of the rear surface of the rear binder member 46. Further the bifurcated portions include arcuately curved rear protrusions 58 abuttable against the upper front surface portion of the rear binder member 52 at an elevation above the pin 51. Advantageously the raising pivotable movement of the handle in the direction opposite arrow 64 is limited to a datum position by the protrusions 58 holding the rear binder member with the rear binder member lower portion abutting against surface 14a.

The base has an arcuately curved top wall portion 11a to form an upwardly opening recess to extend longitudinally from frame portion 13 to a location forwardly of the forwardlymost position of the front head. The slot 44 opens to the transverse central, lowermost part of wall portion 11a to permit small cracked shell pieces to fall therethrough while being arcuately curved to support a nut longitudinally between the heads.

In using the first embodiment with the handle in its raised datum position of FIG. 1 and the rear head assembly in its retracted position of FIG. 1, the head assemblies have their axially closest adjacent parts spaced by a distance substantially greater than the largest nut to be cracked, for example by more than the maximum dimension of a Brazil nut. At this time the binder members 46, 52 are substantially vertical, in their non-binding positions. Now a nut to be cracked is placed on arcuate wall 11a between the heads. Then advantageously the knob 62 which is provided on the rear end of rod 19 is manually moved forwardly so that the conical surfaces 40, 41 of the heads abut against the nut. As the rod 19 moves forwardly, the pin 51, protrusions 58 and frame surface 14a prevent the rear binder moving to a binding position, the frictional drag of the rear binder member 52 on the rod 19 moving the rear binder member from its rod binding position of FIG. 6 if the handle was out of its raised position of FIG. 1 and member 52 was inclined upwardly in a forward direction. At this time the spring 48 retains the binder members 46 in their non-binding vertical position in abutting relationship to the front vertical surface of the frame portion 14.

With the heads abutting against the nut, the front part of tht the handle portion 57b is pushed downwardly to pivot about the pivot axes of pivots 60 (direction of arrow 64). This results in the protrusions 59 moving to exert a forwardly directed force on the binding members 46 at a higher elevation than the rearwardly directed force exerted by spring 48. As a result the binder members 46 move to be upwardly and forwardly inclined and when sufficiently inclined, the upper and lower wall portions defining the apertures 47 are moved into binding relationship to rod 19. After the binder members are in such binding relationship, further movement of the handle toward its lowermost position results in the rod 19 moving forwardly.

As the rod 19 moves forwardly, the nut may move upwardly into recesses 40, 41, the shape of the recesses being such to prevent the uncracked nut moving transversely out from between the heads. Desirably the knives sharp edges are located just axially rearwardly of the transversely adjacent parts of the heads that intersect with the knife slots up until the time the nut, i.e. the recessed surfaces 40, 41 engaging the nut prior to the knives engaging the nut engage the heads. Upon the heads engaging the nut further forward movement of the rod 19 will result in the knife 24 moving forwardly relative to head 23 and the head 34 moving forwardly relative to the front knife so that the sharp edges of the knives abut against the shell, if not already engaging the shell. That is, after the nut is transversely held in place by the heads and until the nut shell is split or cracked, as the rear rod is moved forwardly, the rear head does not move a significant amount in comparison to the movement of rod 19 even though the rear springs in being compressed exert a greater forward force on the rear head and knife 23 moves forwardly. The front head is pushed forwardly against the action of front springs 22 and the front knife remains stationary. The amount of forward movement of the front head would depend upon the extent the rear knife and head acting through the nut pushes the front head forwardly and the knives penetrate the nut shell before the shell cracks and/or splits. Depending on the resiliency and hardness of the shell, further forward movement of the rear knife toward the other results in the knives shearing or splitting and/or breaking of the shell of the nut.

As the handle is moved towards its lowermost position of FIG. 6, the protrusions 58 are arcuately moved in a forward direction and as a result, in permitting the springs 54 forcing the rear binder member 52 to pivotally swing about pin 51 through increasingly greater inclined positions to remain in contact with the protrusions until the binder member is adjacent to surface 14b. Normally prior to the binder 52 abutting against surface 14b, the lower surface of the internal wall of the binder member abuts against the rod, but due to the angle of inclination of the binder member 52, does not block forward movement of the rod 19. However if movement of the handle in the direction of arrow 64 is discontinued and if there is any resilient action of the nut urging the rear knife or the rear head rearwardly of its datum position relative to the rod to urge the rear head assembly rearwardly, the inner wall of the binder member binds against the rod 19 to block rearward movement of the rod. Thus in the event either of the heads in abutting against the nut has moved relative to the respective knife, one or more of the springs 22 will result in a force being applied to rod 19 to resiliently urge the rod to move rearwardly.

In the event the movement of the rear knife toward the front knife does not crack the shell to separate the shell from the meat and the handle has been moved to its lowermost position, rod 19 will not move rearwardly, either for reasons set forth above, or no rearwardly directed force is being exerted on the rod. Upon raising the handle (pivot opposite arrow 64), as the protrusions 59 moves arcuately rearwardly the binder members 46 are moved rearwardly along the rear rod by spring 48, and if the handle is not pivoted sufficiently that the protrusions 58 abut against, but are very closely adjacent to the binder member 52, upon pivoting the handle in the direction of the arrow 64, protrusion 59 again move the binder members 46 to their binding positions to move the rear rod further forwardly than it was moved by first pivoting the handle in the direction of arrow 64. This depressing and raising of the handle front end portion can be repeated a sufficient number of times so that the shell is cracked or split to be separated from the meat. Due to the sharp edges of the knives the meat can not be crushed, but rather may be split if the heads have to be moved sufficiently close to one another to crack the nut. It is noted that instead of initially pushing on the knob 62, the handle front portion can be depressed and raised a sufficient number of times as describe above to move the rear head from the position of FIG. 1 to initially engage the nut and then crack the nut.

With the heads resiliently urged toward one another, usually the heads do not have to move toward one another after the knives engage the nut even though the knives are moved to cut further into the shell. At the same time the heads act to hold the nut in place until such that the knives cut sufficiently into the shell to hold the nut in place. Further due to the generally vertical V-shape of the cutting edges, the knives act to split the shell and to prevent the nut to move transversely from between the heads. Normally the shells break into pieces prior to the knives being moved after engaging the nut more than a small fraction of the longitudinal dimension of the nut being clamped by heads after the heads initially engage the nut.

After the nut is cracked the springs 22 move the heads relative to the rods to their datum positions such that the knives do not extend outwardly of the respective head recessed surface. Further after the nut is cracked and as the handle is raised to its datum position, spring 48 moves the binder members 46 to their FIG. 1 position and protrusions 58 first abut against binder member 52 and then force it to move against the action of spring 54 to its vertical position. Now the rod 19 or knob is manually grasped and moved rearwardly to retract the rear head, the binder member now being substantially vertical so as not to offer any significant resistance to the rearward movement of the rod 19.

Referring to FIGS. 7-10, the second embodiment of the nut cracker apparatus of this invention, generally designated 75, includes a nut cracker unit having a frame H that has first and second longitudinal vertical frame members 76, a transverse front right angle bracket 77 and a transverse rear right angle bracket 78 that are joined together to form a rectangle open top and bottom frame. A transverse rod 79 is mounted by frame members 76 which in turn mounts the rear end of the cylinder 80 of a two way acting piston cylinder combination while a bracket 81 mounts the axial midportion of the cylinder to the frame members 76. The piston cylinder combination also includes a piston rod 84, 85 having a main rod part 84 that has a rear end portion to which there is mounted a piston 130 to move therewith and a front end portion on which an annular retainer 86 is threaded. The piston rod includes a mounting ring 85 that is threaded on the front end portion of the main rod part to extend forwardly thereof.

The piston rod 84, 85 forms a part of the rear head assembly that is generally designated 87, the assembly also including a rear knife 91 that has a pin 88 extended through its tab portion and the front clevised end portion of the piston rod without interfering with longitudinally threading movement of the mounting ring on the rod main part. The knife is of the same construction as that shown in FIG. 5 other than it does not have an ear portion 36g.

The rear head of assembly 87 is rectangular in transverse cross section and has a rearwardly opening bore 92 into which the mounting ring is slidably extended. Springs 94 abut against the retainer 86 which is threaded on the main rod part rearwardly of the mounting ring and into apertures in the rear head to resiliently urge the rear head forwardly. The forward movement of the head relative to the retainer and knife is limited by the wall portion defining the rear end of the knife slot of the head in which the knife 91 extends similar to that described relative to the first embodiment. The head has a front wall portion defining a conical recess 96, the head 91 being movable relative to the knife in the same manner described relative the first embodiment.

The front head assembly, generally designated 101 is of the same construction as the rear head assembly 87 except that the front head assembly is oppositely faced from that of the rear head assembly and includes a longitudinal rod having a main rod part 102 threaded into the front bracket 77 instead of the a piston rod forming a part of a piston cylinder combination and a mounting ring 85 threaded on portion 102. Thus the front head assembly includes a retainer 105 on rod portion 102 rearwardly of the bracket 77, springs 94 abutting against the retainer 105 and into bores in the front head 107 to resiliently urge the front head rearwardly and a front knife 108. The front head is rectangular in transverse cross section and has a a rear wall portion defining a conical recess 109 opening toward recess 96 and being in axial alignment therewith. The front knife is mounted by the front rod in the same manner that the rear knife is mounted by the rear rod. Further the front knife is extended into the front head knife slot with the front head being movable relative the front knife in the same manner as the rear head is movable relative to the rear knife. Due to the size and shapes of the front and rear heads, the heads can at most be rotate a very limited amont before abutting against one of the side frame members 76 to preclude further rotation of the head assemblies in the same direction.

As an example for automatically feeding nuts to be cracked by heads 91, 107 and/or the knives, there is provided feeder apparatus that includes a conveyor C having an endless conveyor belt 116 which has ribs 117 extending transversely to prevent nuts 118 moving back along the belt upper run as the upper run advances in an upward, but predominately horizontal direction. Side members 119 are provided at transverse opposite sides of the belt upper run to prevent the nuts falling off the sides of the belt, the side members being transversely spaced so that only one nut at a time can be dropped off the forwardmost portion of the belt in timed relationship. The belt is trained around an idler pulley 121 and a pulley 122 that through a drive connection 123 is driven by a motor 124. The rearward part of the conveyor is located in the bottom portion of a chute 127 that contains a supply of nuts to move one nut at a time out of the chute.

A nut that drops off the forwardmost part of the conveyor falls between electric eye elements 130, 131 and thence between heads of the second embodiment. Lines 132, 133 electrically connect elements 130, 131 to control circuitry which is represented by a block 135 in FIG. 7. Lines 136, 137 connect circuitry 135 to an electrically operated servo valve 138 to alternately connect the pressurized fluid line 142 to pressurized fluid source 144 and line 143 to a reservoir for source 144 (for example a motor driven pump). Line 140 is connected to one end of cylinder 80 and line 141 to the opposite end of the cylinder. The controls including the photo eye elements, frame 76–78, the chute and conveyor may all be mounted on a frame 138 which can be of any appropriate construction.

With the conveyor being driven at a preselected speed, a nut is moved thereby to fall therefrom to move downwardly between the photo elements which actuates the control circuitry 135 that in turn operates the servo valve 138 to apply pressurized fluid through line 140 such that the rear head is moved toward the front head at a time and a speed the falling nut is caught between the heads, clamped between the heads and then cracked or split by the knives. The movement of the heads relative to the knives and the rods is substantially the same as that described relative to the first embodiment.

The circuitry 135 operates valve 138 to apply pressurized fluid to line 141 and return fluid through line 140 upon the rear knife being moved sufficiently close to the front knife to crack the nut, thereafter rear head and rear knife are retracted and the cracked shell pieces and the nut meat fall downwardly into a container (not shown) below the heads. The pulley 122 is rotated at a speed that the rear head has been retracted after cracking the first nut and then drop a second nut whereby the heads can clamp the second nut as it is dropped to fall between the heads. That is the photo electric elements control the timing of the start of the advancement of the rear head.

The rod 102 can be adjustably threaded in the front bracket 77 to properly space the heads to allow the nuts to fall between the heads.

After the nut has been initially clamped between the heads with minimal pressure, usually the rear knife has to be moved, for example about ⅛" relative to the rear head to crack the nut, the amount in part depending upon the type and shape of the knife.

Since the nut feeder apparatus and the controls system and components for operating the nut cracker unit N may be of varying construction, it is believed the above description is in sufficient detail to allow one skilled in the art to make apparatus for automatically feeding nuts and operating the cylinder in timed relationship so that the unit N will be automatically operated to crack nuts as set forth above.

Due to the adjacent end portions of each of the second embodiments main rod parts being threaded, the longitudinal positions of the of the retainers can be adjusted and thereby the maximum spread apart position of the heads adjusted. Further by threading the mounting rings on the rod main parts, the maximum distance that the knives cutting edges extend longitudinally away from the respective conical surface can be adjusted. It is to be noted that rod 19 can have a main rod part with a threaded front end portion and a mounting ring threaded thereon, and a retainer 21 can be threaded on the main part front end portion rearwardly of the mounting ring whereby member 20 and the groove into which it is extended can be eliminated. Similarly the front rod 33 may be of the same construction as rod 102, 104 and that a retainer could be threaded thereon to have the front springs abut thereagainst instead of abutting against frame portion 12.

What is claimed is:

1. Nutcracker apparatus for cracking and/or splitting a nut having an edible nut meat, comprising a longitudinally elongated frame having longitudinally spaced front and rear ends, a first head assembly, the frame having first means for mounting the first head assembly adjacent to the frame front end, a second head assembly, second means that at least in part includes a frame part for mounting the second head assembly rearwardly of the first head assembly and moving the second head assembly relative to the first head assembly between a first position sufficiently longitudinally spaced from the first head assembly to permit a nut moving between said assemblies and a second position sufficiently closely adjacent to the first head assembly to crack a nut, at least one of the head assemblies including a head having a generally transverse nut engaging first surface facing the other head assembly and a knife slot opening through said first surface, a knife at least in part located in the knife slot and having an edge abuttable against a nut, a longitudinal rod having a first end portion, the knife being mounted to the the rod first end portion in fixed longitudinal relationship thereto and the head being mounted on the rod first end portion for movement relative thereto between a head first position and a head second position, third means mounted on the rod for resiliently retaining the head in the head first position relative to the knife, the head in its second position relative to the knife being more remotely spaced from the other head assembly than in the head first position and the knife edge being located longitudinally outwardly of the first surface such that the knife extends further longitudinally outwardly of the slot in the head second position than in the head first position.

2. The apparatus of claim 1 further characterized in that the first means comprises a front frame portion.

3. The apparatus of claim 2 further characterized in that the said one of the assemblies is the first assembly and that the rod is mounted by the front frame portion for being retained in a fixed longitudinal position as a nut is being cracked.

4. The apparatus of claim 3 further characterized wherein the second head assembly comprises a longitudinal second rod having a first and a second end portion, a second head being on the second rod second end portion and having a generally transverse first surface facing the first head first surface for abutting against a nut as the nut is being cracked, and fourth means for retaining the second head on the second rod, the second means includes a two way acting cylinder that has opposite end portions, the frame part mounts the cylinder in a fixed longitudinal position, a piston within the cylinder and mounted to the second rod second end portion, and control means for applying fluid to one of the cylinder end portions for moving the piston longitudinally toward the frame front end and alternately toward the other of the cylinder end portions for moving the piston toward the frame rear end portion.

5. The apparatus of claim 4 wherein there is provided means for storing a supply of nuts and discharging one nut at a time to fall between the heads after the piston has been moved toward the frame rear end, and that the control means includes operable valve means for applying fluid under pressure to the cylinder to move the piston and thereby the second rod to move the second head toward the first head and means for sensing the falling nut and operating the valve means to time the movement of the second head toward the first head that the nut as it is falling is engaged by both head first surfaces.

6. The apparatus of claim 3 further characterized in that the second head assembly includes a second longitudinal rod, that the frame includes a base, that the above mentioned frame part includes an intermediate frame portion joined to the base, the second rod being mounted by the intermediate frame portion for longitudinal slidable movement with the second head being located longitudinally between the first head and the intermediate frame portion, and that the second means includes manually operable leverage means mounted on the frame for longitudinally moving the second rod toward the first head.

7. The apparatus of claim 6 further characterized in that the second means includes a rear frame portion joined to the base and having the second rod longitudinally slidably extended therethrough, and that the leverage means includes binding means mounted on the second rod for movement relative to the second rod between a position permitting the second rod being slidably moved relative thereto and a second position bindingly engaging the rod to move the second rod forwardly when a forward mechanical force is applied thereto and lever means pivotally mounted on the frame rear portion for movement between a first limit position for permitting the binding means moving to the binding means first position and a second limit position that as being moved from the first limit position to the second limit position for exerting a force to the binding means for moving the binding means from the binding means first position to the binding means second position to thereby move the second rod forwardly.

8. The apparatus of claim 7 further characterized in that the binding means comprises a binding member having a wall portion defining an aperture through which the second rod is extended and an upper portion above the second rod, the binding member aperture being of a diameter that when the binding member extends vertically the second rod can be easily moved relative to the binding member and when the binding member is inclined upwardly in a forward direction and a forward force is applied to the binding member upper portion, move the binding member to its inclined position to binding engage the second rod and move the second rod forwardly.

9. The apparatus of claim 8 further characterized in that the rear frame member has a generally vertical front surface and that the binding means includes a coil spring having one end abutting against the frame intermediate portion and an opposite end abutting against the binding member below the binding member upper portion to resiliently urge the binding member toward the frame rear portion and when the lever means is moved toward its first position, move the binding member from its inclined position to its vertical position and move to abut against the rear frame member front surface.

10. The apparatus of claim 9 further characterized in that the rear frame portion has a rear wall portion defining a lower wall portion defining a lower rear vertical surface portion and an upper upwardly and forwardly inclined rear surface that extends above the second rod central axis, that the frame includes a pair of transversely spaced ears joined to at least one of the base and the rear frame portion to extend rearwardly of the rear wall portion and above the second rod central axis, a rear binding member provided on the second rod and being movable relative to the second rod between a generally vertical first position and an inclined second position, the rear binding member having an internal wall defining an aperture that when the rear binding member is in its vertical first position, the second rod can be easily slidably moved relative to the rear binding member and when in the rear binding member second position to be upwardly inclined in a forward direction and adjacent to the upper inclined surface and bindingly engage the second rod to block rearward movement of the second rod when a rearwardly directed force is applied to the second rod and the lever means has been moved from the lever means first position, spring means abutting against the frame to constantly resiliently urge the rear binding member to its inclined position and means mounted by the ears to limit the rearward of the rear binding member upper portion to the rear binding member vertical position, the lever means having a portion abuttable against the rear binding member upper portion as the lever means is pivoted from its second position to its datum position for moving the rear binding member from its inclined position to its vertical position.

11. The apparatus of claim 3 further characterized in that the second head assembly includes a second rod, a second head mounted on the second rod for longitudinal movement relative thereto and having a generally transverse nut engaging surface facing the first head surface, a forwardly opening knife slot that opens through the second head surface and that in part is defined by a knife slot edge, a second knife extended into the second head slot and secured to the second rod in fixed longitudinal relationship thereto, the second head being movable on the second rod in a forward direction to a position the rear slot edge abuts against the second knife and the second knife extends at the maximum only slightly forwardly of the second head transverse surface, means mounted on the second rod for limiting the rearward movement of the second head relative to the second rod to a position the knife extends a significant distance longitudinally forwardly of the second head transverse surface and resilient urge the second head in a forward direction, the rods having coaxially aligned central axes.

12. The apparatus of claim 11 further characterized in that each of the head transverse surfaces is defined by wall means having a peripheral edge and a portion adjacent the respective rod central axis that is longitudinally more remote from the other head assembly than the peripheral edge and that each of the knives has first and second sharpened edge portions that in a longitudinal direction diverge from one another in a direction away from the central axes of the rods.

13. Apparatus for cracking and/or splitting a nut having an edible nut meat, comprising a first head assembly having a generally transverse surface for engaging a nut while a nut is being cracked, a second head assembly having a generally transverse surface facing the first head assembly transverse surface for engaging a nut while a nut is being cracked, a longitudinally elongated frame having a rear end portion that has a generally vertical front surface part and a front end portion longitudinally spaced from the rear end portion for mounting the first head assembly, the second head assembly including a longitudinally elongated first rod having a central axis and a rod front end portion, the rod being longitudinally slidably mounted by the frame rear end portion, binder means on the rod and having an upper portion, a lower portion and an internal wall defining an aperture of a diameter sufficiently larger than the diameter of the rod that the binder means is movable between a vertical first position permitting the rod to relatively freely move through the aperture and a second position inclined upwardly and forwardly that the said internal wall bindingly engages the rod to move the rod forwardly when a forward directed force is applied to the binder means upper portion, the frame having an intermediate portion between said transverse surfaces and the binder means, means for resiliently urging the binder means to abut against the front vertical surface part and move the the binder means to its vertical position, leverage means mounted on the frame rear portion for movement between a first position permitting the binder means in its vertical position abutting against the front vertical surface part and a second position to, as the leverage means is moved from the leverage means first position toward the leverage means second position, initially move the binder means from the binder means vertical position to the binder means inclined position to bindingly engage the rod and then move the rod forwardly whereby a nut located between said transverse surfaces and closely adjacent thereto is cracked.

14. The apparatus of claim 13 further characterized in that the second head assembly includes a head longitudinally movable on the rod that has the second assembly transverse surface, and maintaining means on the rod for retaining the second head on the rod front end portion and permitting only limited longitudinal movement of the head relative to the rod, the maintaining means including a retainer mounted on the rod in a fixed longitudinal position on the rod and rearwardly of the head and resilient means acting between the retainer and the head for resiliently urging the head in a longitudinally forward direction relative to the rod.

15. The apparatus of claim 14 further characterized in that the head transverse surface is recessed, that the head has a knife slot opening in the recessed surface and rear slot edge, and that the maintaining means includes a knife having a front cutting edge and extended into the slot to have the recessed surface longitudinally adjacent to the knife cutting edge when the head is in its forwardmost position relative to the rod and the cutting edge extending significantly forwardly of the recessed surface when the head is rearwardly of the forwardmost position of the head relative to the rod, the knife being joined to the rod in a fixed longitudinal position relative to the rod and limiting the forward movement of the head when the head knife slot edge abuts against the knife.

16. The apparatus of claim 15 further characterized in that the frame rear portion has a rear wall portion defining a lower surface extending below the rod central axis and an upper upwardly and forwardly inclined surface extending above the rod central axis, a binder member mounted on the rod to extend rearward of the rear wall portion and having an upper portion, a lower portion and an internal wall defining an aperture of a sufficiently larger diameter than the rod that the binder member is movable between a vertical non-rod binding first position and a position inclined upwardly and forwardly in binding relationship to the rod to block rearward movement of the rod relative to the binder member and means mounted on the frame for abutting against the binder member to, when the binder member is in its inclined binding position, block rearward movement of the rod when a rearward directed force is applied to the rod and the leverage means has been sufficiently moved from its first position to permit the binder member moving to its inclined position, and resilient means acting against the frame for constantly resiliently urging the binder member to the binder member inclined position, the leverage means having a portion abuttable against the binder member upper portion as the leverage means is moved from its first position to the leverage means second position to move the binder member to its first position.

17. The apparatus of claim 15 further characterized in that the first head assembly includes a second rod mounted by the frame front end portion, a second knife mounted by the second rod in a fixed longitudinal position relative thereto, a second head having the first assembly transverse surface and wall portions defining a knife slot opening to the second head transverse surface for being mounted on the second rod for slidable movement on the second rod between a rearwardmost position relative to the second rod that is limited by the second knife and a forwardmost position relative to the second rod, retainer means for limiting the forward movement of the second head relative to the second rod and constantly resiliently urging the second head to its rearwardmost position relative to the second rod.

18. The apparatus of claim 17 further characterized in that the frame has a longitudinally extending, transversely arcuately curved surface opening upwardly between the heads and a longitudinally extending slot opening through the arcuately curved surface, and that each knife has a radially extending tab portion extended into the last mentioned slot to prevent any significant rotation of the rods as the heads are longitudinally moved.

19. Apparatus for cracking and/or splitting a nut having an edible nut meat, comprising supply means for containing a supply of nuts and sequentially dropping one nut after another in timed sequence, a nutcracker unit mounted below the supply means for cracking each nut as dropped, the nutcracker unit including a longitudinally elongated frame having a front end portion and a rear end portion, a first head assembly mounted on the frame front end portion and having a transverse rearwardly opening recess for engaging a dropping nut, a second head assembly located rearwardly of the first head assembly and having a transverse forwardly opening surface for engaging a dropped nut, the second head assembly including a longitudinally elongated piston rod, a two way acting cylinder mounted on the frame and having the piston rod slidably extended therein, and opposite front and rear end portions and a piston mounted to the piston rod to extend the piston rod to a fully extended position and to retract the piston rod as fluid under pressure is applied to the cylinder front and rear end portions respectively, the head assemblies being sufficiently longitudinally spaced to have a nut dropped therebetween before the piston rod is moved to its fully extended position and to have cracked a nut when the piston rod is in its fully extended position, a source of fluid under pressure, operable valve means for selectively applying fluid under pressure to one cylinder end portion and then the other to move the piston and return fluid from the end portion opposite the one to which fluid under pressure was applied, and control means for sensing a falling nut and operating the valve means to apply fluid under pressure to the cylinder rear end portion in timed relationship that the second assembly moves to allow the dropped nut to move between the assemblies and crack the nut that is between the assemblies.

20. The apparatus of claim 19 further characterized in that the first and second assemblies include a first and a second head on the first and second rods respectively, each head having the respective transverse surface, means acting against one of the frame front end portion and the first rod for resiliently urging the first head in a rearward direction, the one of the frame front end portion and the means acting against the rod limiting the forward movement of the first head relative to the first rod, means mounted on the second rod for movement therewith for limiting the rearward movement of the second head relative to the second rod and constantially resiliently urging the second head longitudinally forwardly relative to the second rod and first and second limit means mounted to the first and second rods respectively for limiting the movement of the respective first and second head on the rod toward the other head.

21. The apparatus of claim 20 further characterized in that the first and second head has a longitudinally forwardly and rearwardly opening bore respectively into which the respective rod is slidably extended, and a transverse knife slot opening to the respective bore and respective transverse surface and that each limit means includes a knife mounted to extend within the respective slot to limit the longitudinal movement of the respective head toward the other, the knives having adjacent cutting edge portions, the heads in their positions that movement is limited by the knives having the knives adjacent edge portions at least nearly completely retracted into the respective slot and in the other limit positions of the heads have their edge portions extended a substantial distance longitudinally outwardly of the respective slot.

* * * * *